United States Patent
Vijil et al.

(10) Patent No.: US 11,113,081 B2
(45) Date of Patent: Sep. 7, 2021

(54) GENERATING A VIDEO FOR AN INTERACTIVE SESSION ON A USER INTERFACE

(71) Applicant: International Business Machines Corporation, Armonk, NY (US)

(72) Inventors: Enara C. Vijil, Millwood, NY (US); Abhijit Mishra, Karnataka (IN); Seema Nagar, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/693,640

(22) Filed: Nov. 25, 2019

(65) Prior Publication Data

US 2021/0157617 A1    May 27, 2021

(51) Int. Cl.
| | |
|---|---|
| *G06F 3/048* | (2013.01) |
| *G06F 9/451* | (2018.01) |
| *G06K 9/62* | (2006.01) |
| *G06K 9/00* | (2006.01) |
| *G06F 16/9035* | (2019.01) |
| *G06F 16/9032* | (2019.01) |

(52) U.S. Cl.
CPC .......... *G06F 9/453* (2018.02); *G06F 16/9035* (2019.01); *G06F 16/90332* (2019.01); *G06K 9/00463* (2013.01); *G06K 9/6215* (2013.01)

(58) Field of Classification Search
CPC . G06F 3/00; G06F 3/048; G06F 9/451; G06F 16/9032; G06F 16/9035; G06K 9/00; G06K 9/62

See application file for complete search history.

(56) References Cited

U.S. PATENT DOCUMENTS

| | | | |
|---|---|---|---|
| 7,580,911 B2 | 8/2009 | Sun et al. | |
| 9,652,797 B2 | 5/2017 | Vijayaraghavan et al. | |
| 9,794,199 B2 | 10/2017 | Capper et al. | |
| 9,805,718 B2 | 10/2017 | Ayan et al. | |

(Continued)

FOREIGN PATENT DOCUMENTS

WO    2012173894 A2    12/2012

OTHER PUBLICATIONS

IBM, "Context-based user assistance through video", IP.Com, IPCOM000189347D, Nov. 6, 2009, 5 pages.

*Primary Examiner* — Xiomara L Bautista
(74) *Attorney, Agent, or Firm* — Anthony Curro; Edell, Shapiro & Finnan, LLC

(57) ABSTRACT

According to an embodiment of the present invention, a video is generated from a communication session pertaining to support for use of a user interface. A scenario is identified within a document including content of the communication session. One or more items corresponding to the identified scenario and associated with the user interface are extracted from the document. The extracted items are mapped to corresponding aspects of the user interface, wherein at least one of the extracted items remains unmapped to the user interface. At least one question is determined for a user to receive information to map an unmapped item to a corresponding aspect of the user interface. A video is generated based on the mapped aspects of the user interface to reproduce one or more activities performed during the use of the user interface.

20 Claims, 8 Drawing Sheets

(56) References Cited

U.S. PATENT DOCUMENTS

| | | |
|---|---|---|
| 10,430,212 B1 * | 10/2019 | Bekmambetov ........ G06F 9/451 |
| 2003/0053420 A1 | 3/2003 | Duckett et al. |
| 2012/0260263 A1 | 10/2012 | Edoja |
| 2013/0136253 A1 * | 5/2013 | Liberman Ben-Ami .................... H04M 3/5191 379/265.09 |
| 2018/0075146 A1 * | 3/2018 | Petrescu ............. G06F 16/9535 |

\* cited by examiner

GENERATING A VIDEO FOR AN INTERACTIVE SESSION ON A USER INTERFACE

BACKGROUND

1. Technical Field

Present invention embodiments relate to video generation, and more specifically, to generating a video of an interactive session on a user interface based on documents (e.g., logs, etc.) including content of a communication session pertaining to the interactive session.

2. Discussion of the Related Art

Replay of an interaction or activity on a user interface of a web or application portal is a useful task for business process analytics, user interaction quality analytics and optimization, and business process training (e.g., identifying problematic areas of the user interface where users tend to stumble). In general, activity replay of the user interface assists in obtaining a better understanding of the individual users and the effectiveness of the user interface for the users.

While correct or expected behavior of users on the user interface of the web or application portal is insightful, the correct behavior may be clustered, and need not be repeatedly stored. This may be more applicable for user interfaces handling numerous users and corresponding activities, where most of these activities exhibit correct user behavior.

With respect to errors and issues encountered by users on the user interface of the web or application portal, each of the activities pertaining to the errors and issues need to be stored, analyzed, addressed, and resolved. Further, identifying the points on the user interface and/or reasons causing users to contact a support center may be critical for improving effectiveness of the user interface and performance of corresponding transactions. However, storing user activities on the user interface may only be practical for a portion of the users due to the amount of resources required to collect activities of all users. This especially applies to user interfaces handling numerous users and corresponding activities.

SUMMARY

According to one embodiment of the present invention, a system includes at least processor to generate a video. The system identifies a scenario within a document including content of a communication session pertaining to support for use of a user interface. One or more items corresponding to the identified scenario and associated with the user interface are extracted from the document. The extracted items are mapped to corresponding aspects of the user interface, wherein at least one of the extracted items remains unmapped to the user interface. At least one question is determined for a user to receive information to map an unmapped item to a corresponding aspect of the user interface. A video is generated based on the mapped aspects of the user interface to reproduce one or more activities performed during the use of the user interface. Embodiments of the present invention further include a method and computer program product for generating a video in substantially the same manner described above.

Present invention embodiments generate a post-facto video from a document containing content of the communication session (e.g., a service log, etc.) using interface context and intelligent question generation. This avoids the need to record each of the actions performed on a user interface for producing a replay, thereby reducing storage requirements and preventing consumption of significant processing resources. Further, present invention embodiments selectively identify particular scenarios within the document for generation of the video, thereby avoiding storage of each of the activities performed on the user interface which may consume substantial storage and require significant processing resources, especially for user interfaces handling numerous users and corresponding activities. In addition, the video is generated from a document (e.g., service or other log, etc.) to enable easier understanding of the activities through visualization, rather than manually reviewing and understanding numerous messages within the document.

An embodiment of the present invention may identify a scenario within the document containing content of the communication session. This may be accomplished by determining a similarity score based on a comparison of a group of keywords from the document to a set of filtering concepts indicating criteria for the scenario, and identifying the scenario based on the similarity score satisfying a threshold. Accordingly, present invention embodiments understand or filter user activity to selectively generate a video for desired scenarios, thereby avoiding storing each of the activities performed on the user interface which may consume significant amounts of storage resources.

An embodiment of the present invention may further generate one or more activity questions for the user to receive information pertaining to the order of performance of a plurality of disconnected activities, and determine the order of performance of the plurality of disconnected activities based on the information received in response to the one or more activity questions. An embodiment may also generate one or more activity questions for the user to receive information pertaining to an order of performance of a plurality of activities mapped to aspects of the user interface, and identify a particular path corresponding to the plurality of activities from among plural paths based on the information received in response to the one or more activity questions. In addition, an embodiment may generate one or more leading questions for the user to recall information pertaining to an unmapped item, and infer a mapping to the user interface for the unmapped item based on the recalled information received in response to the one or more leading questions.

Present invention embodiments generate the video by asking activity-related questions to the user to determine the activities performed by the user in the user interface of the web or application portal (e.g., before seeking assistance via the communication session). This ensures that appropriate activity elements are inserted in the video, and that the video is augmented with the proper context, permitted activities, and dynamics of the specific web or application portal.

BRIEF DESCRIPTION OF THE DRAWINGS

Generally, like reference numerals in the various figures are utilized to designate like components.

DETAILED DESCRIPTION

Figure 1:
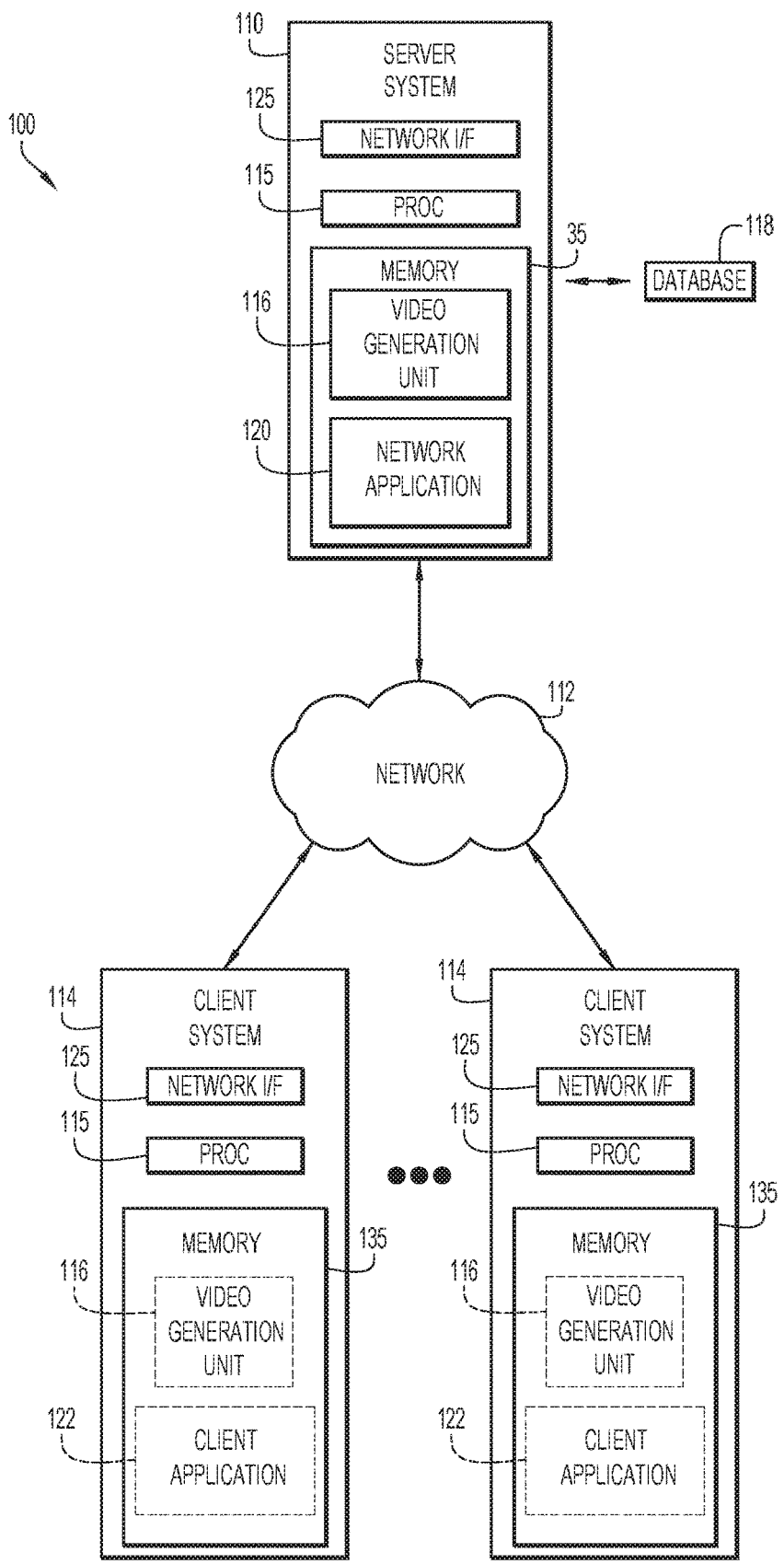
FIG. 1 is a diagrammatic illustration of an example environment according to an embodiment of the present invention.

Errors and issues encountered by users on a user interface of a web or application portal need to be stored, analyzed, addressed, and resolved. Further, identifying the points on the user interface and/or reasons causing users to contact a support center may be critical for improving effectiveness of the user interface and performance of corresponding transactions. However, storing each of the activities on the user interface may only be practical for a portion of the users due to the amount of resources required to collect activities of all users. This especially applies to user interfaces handling numerous users and corresponding activities.

Present invention embodiments map entities mentioned in a document (e.g., including any type of log, file, or other data storing object containing a set of messages from a chatbot, chat session, message session, or conversational interface, etc.) to attributes (e.g., artifacts, elements, properties, etc.) of the user interface of the web or application portal. The document may be generated in various manners (e.g., from a chatbot, chat session, message session, conversational interface, etc.). Further, activities mentioned in the document are mapped to activities permitted by the user interface of the web or application portal on the attributes. Questions may be provided to obtain responses pertaining to an element or activity of the user interface to resolve ambiguities. The questions may also be provided when, in the context of the user interface or of the web or application portal, the element or activity cannot be inferred from domain, entity, activity, or other element based inference techniques. A timestamp is associated with each activity performed on each element of the user interface by the user by detecting sequences of activities using natural language processing (NLP) techniques on activities identified in the document.

When a partially specified entity or activity is encountered for which the user cannot produce a response to a question (e.g., the user does not remember), knowledge about the entities and activities, and the possible interactions between them, may be used to determine the entity, activity or a corrective action. The video is generated based on the collected information. The user interface is used as a background for the video, while declared and requested entities and activities are used as a foreground. Inferred entities and activities are inserted in the video, while any unresolved (and/or unnecessary) entities are marked or replaced with default (e.g., sentinel) objects.

According to one embodiment of the present invention, a system includes at least one processor to generate a video. The system identifies a scenario within a document including content of a communication session pertaining to support for use of a user interface. One or more items corresponding to the identified scenario and associated with the user interface are extracted from the document. The extracted items are mapped to corresponding aspects of the user interface, wherein at least one of the extracted items remains unmapped to the user interface. At least one question is determined for a user to receive information to map an unmapped item to a corresponding aspect of the user interface. A video is generated based on the mapped aspects of the user interface to reproduce one or more activities performed during the use of the user interface. Embodiments of the present invention further include a method and computer program product for generating a video in substantially the same manner described above.

Present invention embodiments generate a post-facto video from a document containing content of the communication session (e.g., a service log, etc.) using interface context and intelligent question generation. This avoids the need to record each of the actions performed on a user interface for producing a replay, thereby reducing storage requirements and preventing consumption of significant processing resources. Further, present invention embodiments selectively identify particular scenarios within the document for generation of the video, thereby avoiding storing each of the activities performed on the user interface which may consume substantial storage and require significant processing resources, especially for user interfaces handling numerous users and corresponding activities. In addition, the video is generated from a document (e.g., service or other log, etc.) to enable easier understanding of the activities through visualization, rather than manually reviewing and understanding numerous messages within the document.

An embodiment of the present invention may identify a scenario within the document containing content of the communication session. This may be accomplished by determining a similarity score based on a comparison of a group of keywords from the document to a set of filtering concepts indicating criteria for the scenario, and identifying the scenario based on the similarity score satisfying a threshold. Accordingly, present invention embodiments with this feature provide an advantage of understanding or filtering user activity to selectively generate a video for desired scenarios, thereby avoiding storing each of the activities performed on the user interface which may consume substantial storage resources.

Thus, a present invention embodiment may not create a video for each user individually, or a generic video for all users. Rather, policies are set and used to filter the document to decide, at runtime (e.g., during the communication session), whether or not to add the user session (and the information obtained from the document) as a target to create a video. When the policy is satisfied, questions may be generated and responses parsed for obtaining precise details of entities and activities from the user that could not be inferred from the communication session, a user profile, and/or user interface recorded usage context. The policies basically identify when a video is to be constructed for a user session based upon information obtained in a communication session pertaining to support for the user interface.

An embodiment of the present invention may further generate one or more activity questions for the user to receive information pertaining to the order of performance of a plurality of disconnected activities, and determine the order of performance of the plurality of disconnected activities based on the information received in response to the one or more activity questions. An embodiment may also generate one or more activity questions for the user to receive information pertaining to an order of performance of a plurality of activities mapped to aspects of the user interface, and identify a particular path corresponding to the plurality of activities from among plural paths based on the information received in response to the one or more activity questions. In addition, an embodiment may generate one or more leading questions for the user to recall information pertaining to an unmapped item, and infer a mapping to the user interface for the unmapped item based on the recalled information received in response to the one or more leading questions.

Present invention embodiments generate the video by asking activity-related questions to the user to determine the activities performed by the user in the user interface of the web or application portal (e.g., before seeking assistance via the communication session). Present invention embodiments with these features provide the advantages of ensuring that appropriate activity elements are inserted in the video, and that the video is augmented with the proper context, permitted activities, and dynamics of the specific web or application portal.

An example environment for use with present invention embodiments is illustrated in FIG. 1. Specifically, environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to interact with a network application 120 (e.g., a web or other application, etc.) of server systems 110 for various operations (e.g., transactions, services, etc.). The network application may further provide assistance or support for performing operations on a user interface of the network application. The user interface of the network application may comprise one or more aspects including components and activities (e.g., button actuation, navigation, selection, etc.). The activities may be specified in a workflow for the user interface. The user interface components include one or more interface objects (e.g., displays, screens, pages, windows, etc.) to exchange (e.g., provide and/or receive) information with a user, and various attributes (e.g., elements (e.g., fields, actuators, buttons, etc.), properties, artifacts, etc.). The various attributes may be associated with the user interface and/or interface objects. For example, a user interface associated with a network application in the form of a website or portal may include interface objects in the form of web pages of the website or portal. The assistance or support may be in the form of a communication session (e.g., chatbot, chat session, messaging session, etc.) to obtain information from a user based on responses to questions or inquiries. The communication session may be automated (e.g., automatically generated questions, etc.) or conducted manually (e.g., communication with a local or remote support provider, etc.), where the communication session may be recorded to produce a document. The document may include any type of file, log, or other data storing object for storing content (e.g., inquiry and responses, messages, etc.) of the communication session. The document may include any portion of the communication session (e.g., the communication session may be on-going and the document represents a portion up to a certain point, the entirety of the communication session, etc.). Server systems 110 include a video generation unit 116 to generate a video of interactions with the user interface of network application 120 based on the document containing the content of the communication session.

A database system 118 may store various information for the video generation (e.g., video information, interface information, interface workflows, questions, rules for presenting questions, rules of inference, rendering information, communication session documents, entries for items extracted from the document, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present the user interface of network application 120.

Server systems 110 and client systems 114 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, video generation unit, network application, local client application, browser/interface software, etc.).

Alternatively, one or more client systems 114 may produce a video of interactions with the user interface of network application 120 or a local client application 122. The local client application may provide various operations (e.g., transactions, etc.), and may further provide assistance or support for performing operations on a user interface of the local client application. The user interface of the local client application may comprise one or more components and activities (e.g., button actuation, navigation, selection, etc.). The activities may be specified in a workflow for the user interface. The user interface components include one or more interface objects (e.g., displays, screens, pages, windows, etc.) to exchange (e.g., provide and/or receive) information with a user, and various attributes (e.g., elements (e.g., fields, actuators, buttons, etc.), properties, artifacts, etc.). The various attributes may be associated with the user interface and/or interface objects. For example, a user interface associated with a local client application may include interface objects in the form of displays, screens, pages, windows, and/or other user display objects provided by the local client application. The assistance or support may be in the form of a communication session (e.g., chatbot, chat session, messaging session, etc.) to obtain information from a user based on responses to questions or inquiries. The communication session may be automated (e.g., automatically generated questions, etc.) or conducted manually (e.g., communication with a local or remote support provider, etc.), where the communication session may be recorded to produce a document. The document may include any type of file, log, or other data storing object for storing content (e.g., inquiry and responses, messages, etc.) of the communication session. The document may include any portion of the communication session (e.g., the communication session may be on-going and the document represents a portion up to a certain point, the entirety of the communication session, etc.).

In a stand-alone mode of operation, the client system stores or has access to a document containing content pertaining to a communication session for using a user interface of the network application or the local client application, and includes the video generation unit to generate a video of user interactions in substantially the same manner described below. The user interface of the network application and the local client application may include any graphical user (e.g., GUI, etc.) or other interface (e.g., command line prompts, menu screens, etc.) to perform activities and solicit information from users pertaining to the desired analysis and video. The user interface of the network application and the client application may provide the video and reports including any desired results from analysis of the document containing content of the communication session.

The video generation unit may include one or more modules or units to perform the various functions of present invention embodiments described below. The various units and modules (e.g., video generation unit 116, network application 120, local client application 122, etc.) may be implemented by any combination of any quantity of software and/or hardware modules or units, and may reside within memory 135 of the server and/or client systems for execution by processor 115.

Figure 2:
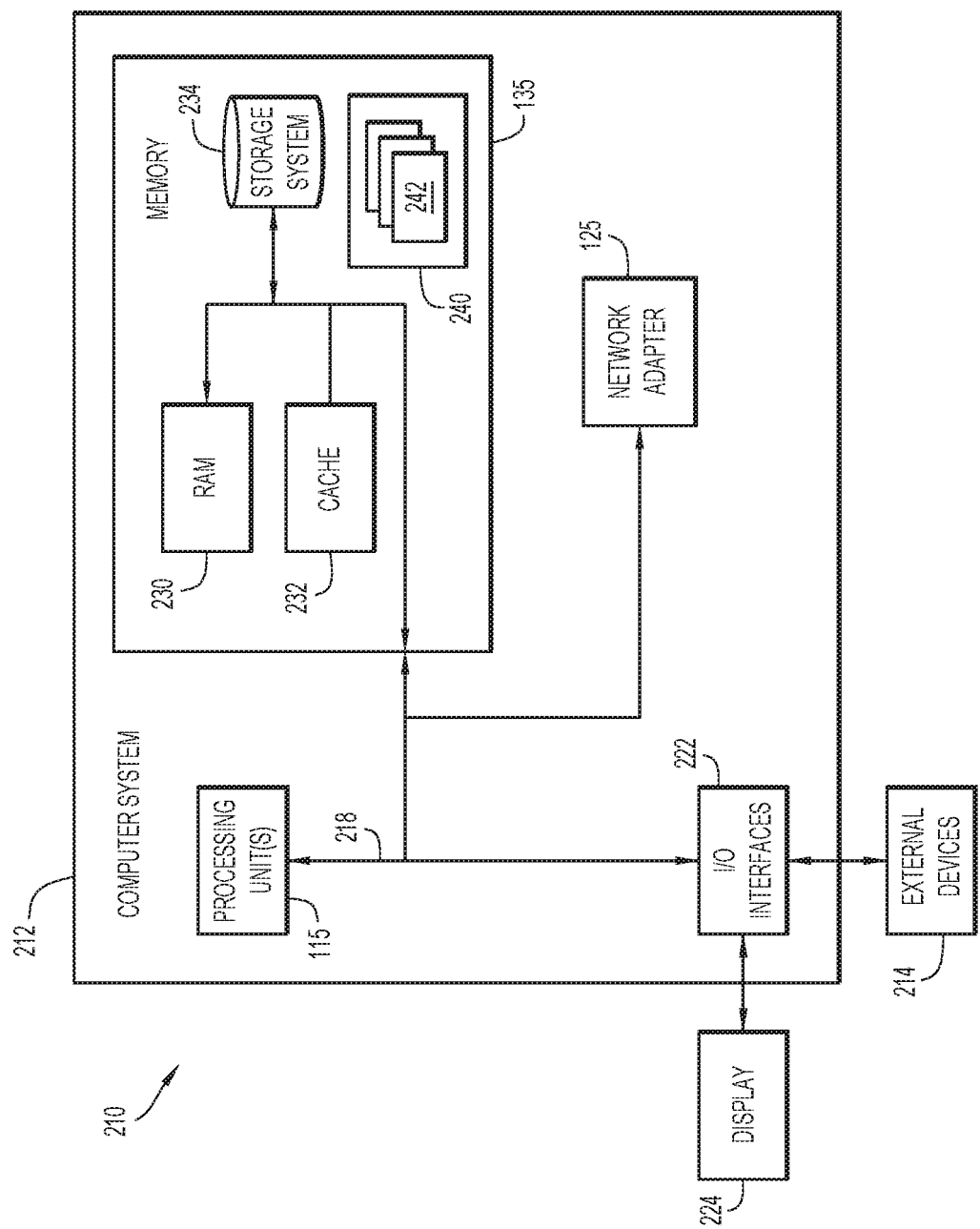
FIG. 2 is a block diagram of an example computing device according to an embodiment of the present invention.

Referring now to FIG. 2, a schematic of an example of a computing device 210 of environment 100 (e.g., implementing server system 110 and/or client system 114) is shown. The computing device is only one example of a suitable computing device for environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a general-purpose computing device. The components of computer system 212 may include, but are not limited to, one or more processors or processing units 115, a system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., video generation unit 116, network application 120, client application 122, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
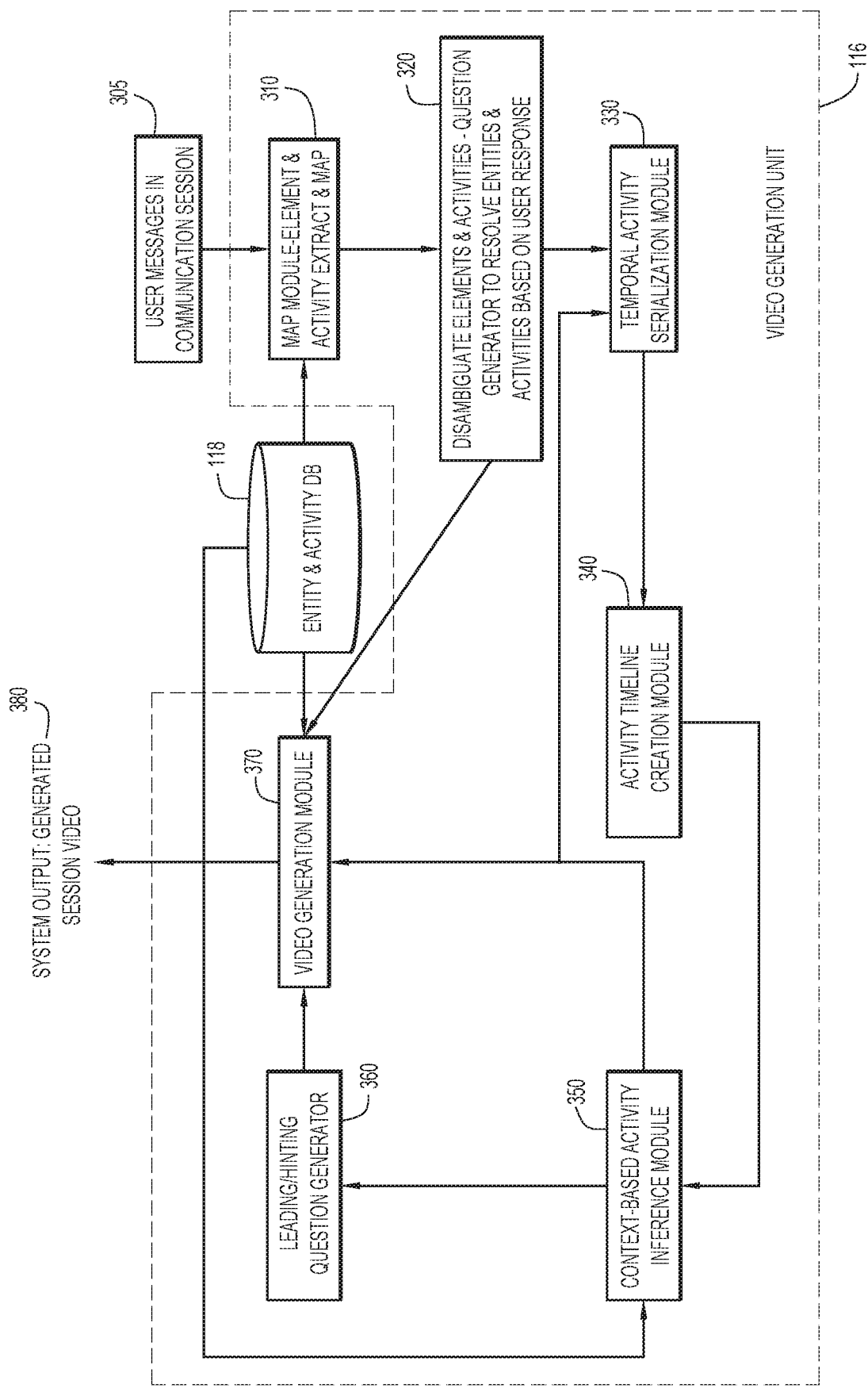
FIG. 3 is a block diagram illustrating a flow of the video generation unit of FIG. 1 for generating a video of user activities according to an embodiment of the present invention.

A manner of producing a video from a communication session according to an embodiment of the present invention is illustrated in FIG. 3. Initially, a communication session is initiated by a user interacting with a user interface in order to obtain assistance or support (e.g., with the user interface, a product and/or service offered, etc.) at operation 305. The communication session is recorded and stored in a document. The document may include any type of file, log, or other data storing object for storing content (e.g., inquiry and responses, messages, etc.) of the communication session. The communication session may be implemented by any conventional or other mechanisms (e.g., chatbot, chat session, message session, etc.) employing any desired language model. The user interface and communication session may be provided by network application 120 of a server system 110 or local client application 122 of a client system 114.

Video generation unit 116 analyzes the document containing content of the communication session and produces a video of the interactions with the user interface. The video generation unit includes a map module 310, a question generator 320, a temporal activity serialization module 330, an activity timeline creation module 340, a context-based activity inference module 350, a leading question generator 360, and a video generation module 370. However, the video generation unit may include any quantity of modules to perform the various functions of present invention embodiments. The various modules of the video generation unit (e.g., map module 310, question generator 320, temporal activity serialization module 330, activity timeline creation module 340, context-based activity inference module 350, leading question generator 360, and video generation module 370) may be implemented by any combination of any quantity of software and/or hardware modules or units, and may reside within memory 135 of the server and/or client systems for execution by processor 115.

Video generation unit 116 receives the document containing content of the communication session. Map module 310 analyzes the document to map items (e.g., entities and activities) mentioned in the document to corresponding aspects (e.g., components and activities) of the user interface. The results of the mapping are provided to question generator 320 to determine items from the document that are ambiguous. The ambiguity may arise from insufficient information available in the document to map the item to a corresponding aspect of the user interface. Question generator 320 generates questions or inquiries for presentation to the user in order to obtain responses with supplemental information sufficient for resolving the ambiguity (e.g., enabling mapping of the ambiguous items to corresponding aspects of the user interface).

Temporal activity serialization module 330 determines an order of performance of the activities within the document. This may be accomplished based on a workflow of the user interface as described below. Activity timeline creation module 340 generates a timeline of the activities based on the order of performance.

In the event there may be insufficient information to identify an activity, context-based activity inference module 350 may infer the activity. This may be accomplished by leading question generator 360 generating questions or inquiries for presentation to the user to obtain responses with supplemental information enabling determination or inference of the unidentified activity. The inferred activity may be provided to temporal activity serialization module 330 and/or activity timeline creation module 340 to determine the order of performance of activities and timeline based on the inferred activity. Video generation module 370 generates a video 380 of the user interactions on the user interface based on the determined and/or inferred information.

Figure 4:
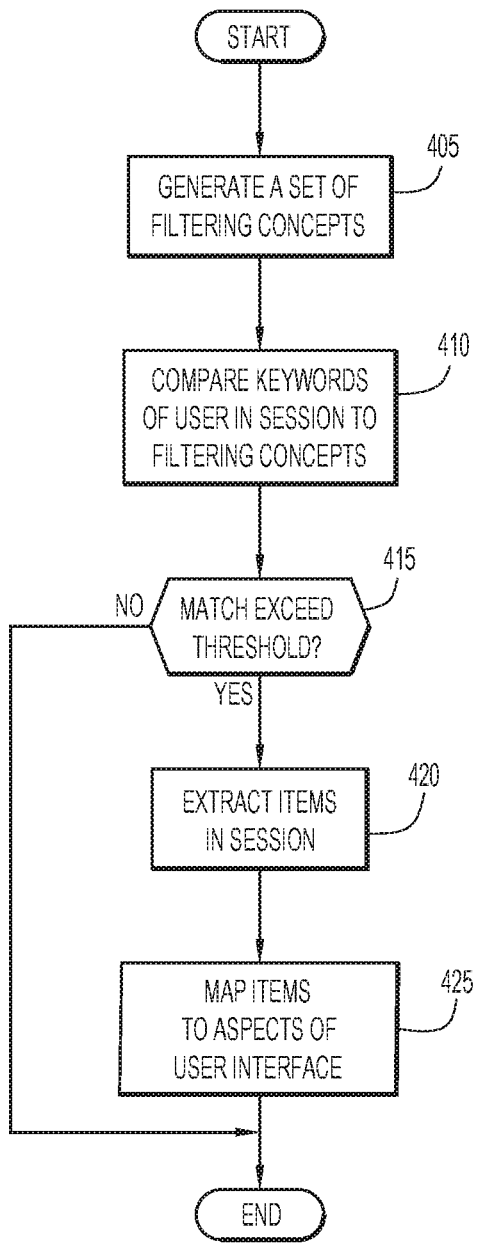
FIG. 4 is a procedural flowchart illustrating a manner of mapping items indicated by a user in a communication session to corresponding aspects of a user interface according to an embodiment of the present invention.

A manner of mapping items of the document containing content of the communication session to corresponding aspects (e.g., components and/or activities) of the user interface (e.g., via map module 310, and server system 110 and/or client system 114) according to an embodiment of the present invention is illustrated in FIG. 4. Initially, map module 310 (FIG. 3) receives the document containing content of the communication session of the user seeking support or assistance with the user interface, and maps the items (e.g., entities and/or activities) therein to corresponding aspects (e.g., components and/or activities) of the user interface. The document, user interface, and communication session may be provided by network application 120 of a server system 110 or local client application 122 of a client system 114.

A set of one or more filtering concepts is set at operation 405 in order to identify an interactive session (or scenario) including one or more activities for which generation of a video is desired. For example, storing each of the activities performed on the user interface may only be practical for a portion of the users due to the amount of resources required to collect activities of all users. This especially applies to user interfaces handling numerous users and corresponding activities. Accordingly, the set of filtering concepts basically forms a policy and includes criteria for selectively generating the video for particular sessions or scenarios on the user interface. However, the policy may be specified in any desired manner (e.g., rules, conditions, etc.). The set of filtering concepts may be selected from one or more ontologies including various concepts and concept relationships (e.g., types of transactions, types of activities to perform the transactions, types of user interface elements, etc.) in order to indicate the particular sessions or scenarios with activities desired for generation of the video. The set of filtering concepts may be selected by a user, or determined by the system based on natural language or other inputs describing the particular sessions or scenarios.

A group of one or more keywords within the document is identified and compared with the set of filtering concepts at operation 410 to determine a presence of an interactive session or scenario with activities for which a video is desired. The keywords may be provided in a list, one or more dictionaries, and/or other repositories for comparison with the document. The keywords may include terms describing aspects (e.g., components and/or activities) of the user interface, and may be based on concepts within the ontologies associated with the filtering concepts (e.g., concept names, synonyms, related terms, concept relationships, etc.). The comparison may employ any form of conceptual matching (e.g., semantic matching, keyword match volume and count, word similarity, edit distance, etc.), and may utilize various information from the one or more ontologies (e.g., concept names, concept relationships, etc.) for matching with the group of keywords. The conceptual matching typically produces a matching or similarity score indicating a similarity between the group of keywords and set of filtering concepts. The matching score may be based on a similarity score (e.g., cosine similarity, edit distance, etc.) produced for each individual filtering concept, where the similarity scores for the individual filtering concepts may be combined to generate the matching score for the set of filtering concepts (e.g., combining individual similarity scores or weighted similarity scores for the filtering concepts, etc.).

Alternatively, the matching score may be based on a similarity score (e.g., cosine similarity, edit distance, etc.) produced for each individual keyword, where the similarity scores for the individual keywords may be combined to generate the matching score for the group of keywords (e.g., combining individual similarity scores or weighted similarity scores for the keywords, etc.).

When a matching score between the group of keywords and set of filtering concepts satisfies a threshold as determined at operation 415, the group of keywords represents a session or scenario with activities for which generation of a video is desired. In this case, items mentioned in the document are extracted at operation 420 and mapped to corresponding aspects (e.g., components and/or activities) of the user interface at operation 425. The items extracted from the document include entities (e.g., corresponding to interface objects and attributes of the user interface) and activities corresponding to the scenario for which generation of the video is desired. The extraction and mapping may be based on the keywords in the repository, concepts of the one or more ontologies, and/or known information pertaining to the aspects (e.g., components and activities) of the user interface stored in database 118. The extraction may be performed using various natural language processing techniques (e.g., entity detection, relationship detection, etc.). The mapping may be performed based on various comparison or matching operations (e.g., cosine similarity, word embedding, natural language processing (NLP) techniques (e.g., surrounding words, neighboring words, entity detection, relationship detection, etc.), etc.) applied to any desired attributes (e.g., name, properties, etc.) of the entities and activities being compared.

Figure 5:
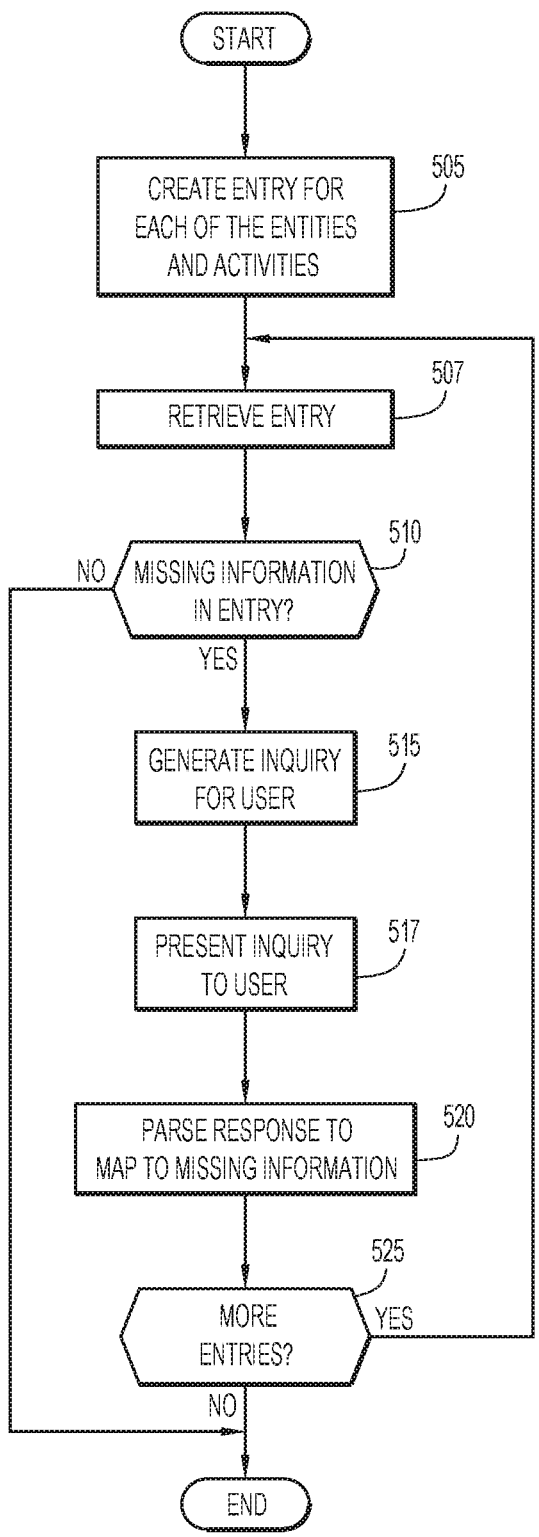
FIG. 5 is a procedural flowchart illustrating a manner of obtaining supplemental information from a user in order to map items indicated by a user in a communication session to corresponding aspects of a user interface according to an embodiment of the present invention.

In the event one or more extracted items (e.g., entities and/or activities) are unable to be mapped to corresponding aspects (e.g., components and/or activities) of the user interface, supplemental information may be obtained from the user that provides assistance for creating the post-facto video of the interactive session. A manner of requesting supplemental information (e.g., via question generator 320, and server system 110 and/or client system 114) according to an embodiment of the present invention is illustrated in FIG. 5. Initially, an entry is created for each entity and activity extracted from the document at operation 505. The entry for an extracted entity or activity includes fields for an element of the user interface associated with the extracted entity or activity, an activity of the user interface associated with the extracted entity or activity, and a context of the user interface associated with the extracted entity or activity (e.g., interface object associated with the extracted element or activity, etc.). Each entry is further indicated (e.g., by a flag or other indicator) as being identified when the entry includes information for each of the fields (e.g., the extracted entity or activity has been mapped to an element, activity, and context of the user interface).

An entry is retrieved at operation 507, and examined to determine if the retrieved entry is missing information for at least one of the fields at operation 510. When the entry is missing information for at least one of the fields (e.g., element, activity, and/or context), question generator 320 may generate one or more questions for presentation to the user at operation 515 to obtain supplemental information for determining the missing information. The question generator may further apply natural language processing (NLP) or other techniques to a history of the document (e.g., including previous communication sessions, etc.) to identify the information. For example, question generator 320 may generate a question of the form "When you clicked on the button, which webpage were you on?" in case the webpage or context is missing in the entry (or cannot be determined from the document history (e.g., the button was not present on an earlier webpage)). The question generator may further generate a question of the form "Did you click the button on the top left corner of the page or at the bottom center?" in order to determine a missing element or activity of the entry.

The questions may be in the form of a question template including content of the question and corresponding parameters indicating the desired information to request. A set of information rules may be provided to identify the appropriate question template for the retrieved entry. Each information rule may provide criteria or conditions for employing a corresponding question template. One or more information rules within the rule set may be identified based on the fields present in the retrieved entry (e.g., element, activity, and/or context) and known information about the fields (e.g., names, locations, associated interface components and/or activities of the user interface, etc.). The criteria or conditions of the identified rules are applied to the information associated with the retrieved entry to select the appropriate question template. Once a question template is selected, values for the parameters of the selected question template may be obtained from the fields present in the retrieved entry and/or known information of the user interface (e.g., aspects, workflows, rendering information, etc.) to generate the question from the selected question template.

Alternatively, the question generator may employ one or more machine learning models to select an appropriate question or question template. In this case, the machine learning models may be trained with entries with missing information extracted from a corpus of documents of communication sessions and corresponding questions or question templates to learn appropriate questions to provide. Question generator 320 may employ various models to perform the learning (e.g., neural networks, mathematical/statistical models, classifiers, etc.). The machine learning models may receive information of the retrieved entry (e.g., fields and/or associated known user interface information) as input and be utilized to indicate a question or question template. The fields present in the retrieved entry and/or known information of the user interface (e.g., aspects, workflows, rendering information, etc.) may be used as parameter values in the identified question template to generate the question as described above.

The questions are presented to the user at operation 517. The questions may be presented on the interface used for the communication session, or another interface generated by video generation unit 116. A response from the user to the presented questions is received and parsed at operation 520 to identify within the response the information missing from the entry (e.g., mapped element, activity, and/or context of the user interface). This may be accomplished by applying various natural language processing (NLP) techniques (e.g., entity detection, etc.). The retrieved entry may be updated with the missing information (e.g., from the document history and/or user responses) to map the extracted entity or activity of the retrieved entry to the user interface. Alternatively, the identified information in the response may indicate, or be used to determine, the missing information (e.g., mapped element, activity, and/or context of the user interface) from known information of the user interface (e.g., aspects, workflows, rendering information, etc.), and the retrieved entry is updated with the indicated or determined information. The above process is repeated (e.g., from operation 507) until each entry has been processed as determined at operation 525.

Typically, details of activities of the interactive session on the user interface are expected to be provided in chronological order by the user within the communication session. However, users may use terms that indicate temporal ambiguity with respect to performance of the activities. For example, a user may provide a response such as "I did X, then did Z, and by the way, obviously I did not forget to do Y before Z", where the chronological order of activities X, Y, and Z may not be determined or is ambiguous (e.g., the order of performance may be X, Y, Z or Y, X, Z).

Figure 6:
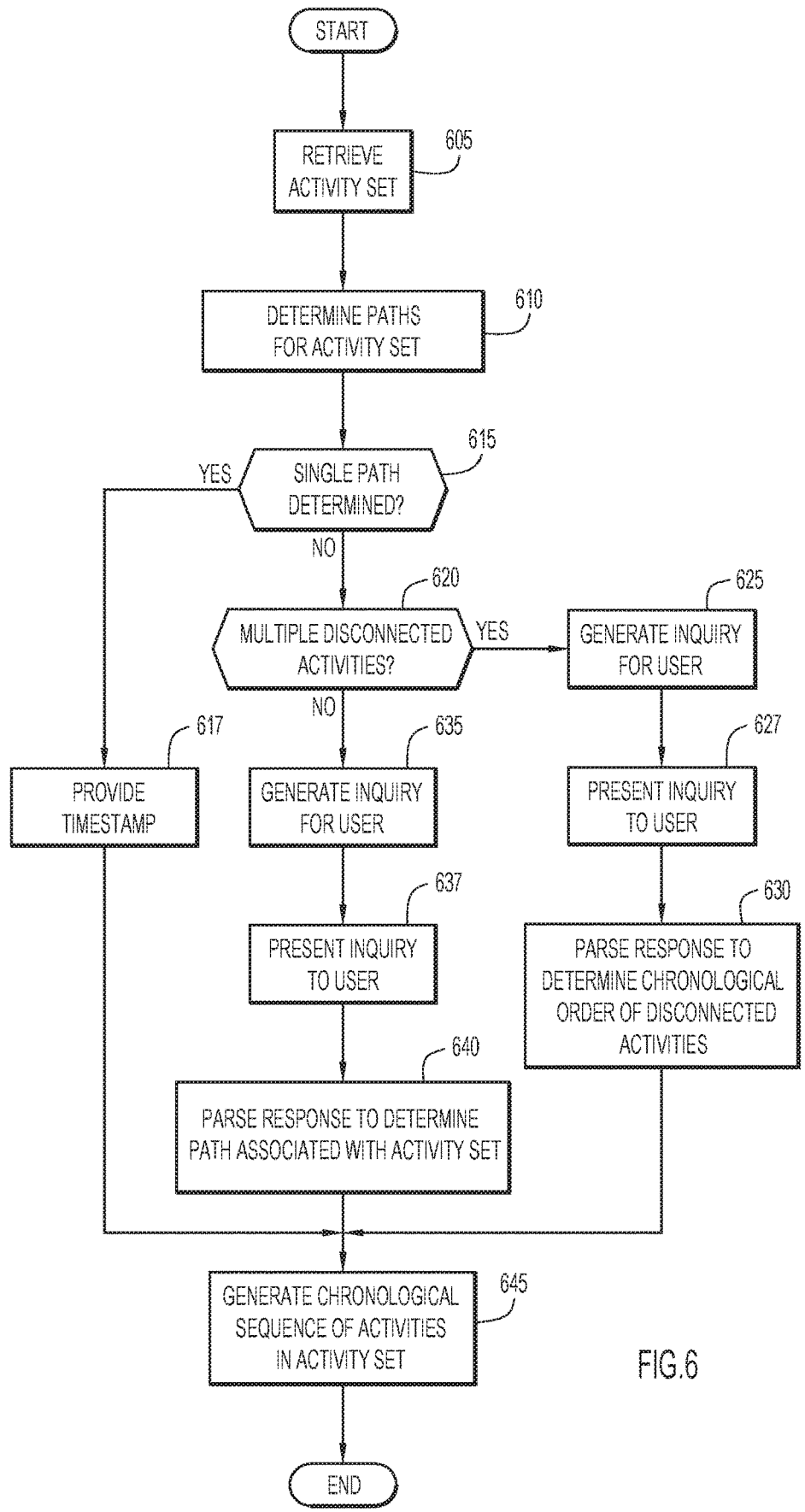
FIG. 6 is a procedural flowchart illustrating a manner of determining an order of activities indicated by a user in a communication session according to an embodiment of the present invention.

A manner of determining a chronological order of activities (e.g., via temporal activity serialization module 330 and activity timeline creation module 340, and server system 110 and/or client system 114) according to an embodiment of the present invention is illustrated in FIG. 6. Initially, a respective workflow for network application 120 and local client application 122 is stored in a repository (e.g., database 118). Each workflow specifies ordered sequences of permitted activities (and corresponding aspects) to be performed on the user interface. Temporal activity serialization module 330 determines a timestamp or order of performance of each activity within an interactive session, while activity timeline creation module 340 creates a timeline of the activities.

Specifically, an activity set of one or more activities of the interactive session is retrieved by the temporal activity serialization module 330 at operation 605. The set of activities may be obtained from the set of entries (e.g., containing a mapped element, activity, and context of the user interface) created for the extracted entities and/or activities. The interactive session may be from the network application 120 or local client application 122. Paths for the activity set are identified at operation 610. Each path corresponds to an order of the activities of the activity set. By way of example, paths for activities X, Y, and Z may include: path 1 (X, Y, Z; with X performed prior to Y and Y performed prior to Z), path 2 (Y, Z, X; with Y performed prior to Z and Z performed prior to X), etc. The paths for the activity set may be determined from the document of the communication session based upon inference from the workflow (e.g., since a button to perform Z is not present on a page of Y, an order of activities should be Y, X, Z). The inference may be generated based on a series of sequence rules specifying criteria or conditions for ordering activities. The sequence rules may be used with information from the user as described below to identify a path for the activity set.

When a single path for the activity set is identified as determined at operation 615, a timestamp or other indicator specifying an order of the activities is provided for each activity of the activity set based on the identified path at operation 617. The timestamp may also be determined from the document by applying natural language processing (NLP) techniques (e.g., entity detection, relationship detection, etc.) to the document.

When no paths or plural paths are identified as determined at operation 615, the activity set is examined for the presence of disconnected activities at operation 620. Disconnected activities are present where one activity may occur before or after another activity, and/or predecessor and successor activities may be the same. When disconnected activities are identified, one or more activity questions or inquiries may be generated at operation 625 to obtain supplemental information to determine an order of the disconnected activities. For example, the activity question may be of the form "Do you remember whether you did X first or Y first?".

The activity questions may be in the form of an activity question template including content of the activity question and corresponding parameters indicating the desired information to request. A set of activity rules may be provided to identify the appropriate activity question template for the disconnected activities. Each activity rule may provide criteria or conditions for employing a corresponding activity question template. One or more activity rules within the rule set may be identified based on the activities, workflow, and known information about the activities (e.g., names, locations, associated components of the user interface, etc.). The criteria or conditions of the identified activity rules are applied to the information associated with the disconnected activities to select the appropriate activity question template. Once an activity question template is selected, values for the parameters of the selected activity question template may be obtained from the activities and/or known information of the user interface (e.g., aspects, workflows, rendering information, etc.) to generate the activity question from the selected activity question template.

Alternatively, temporal activity serialization module 330 may employ one or more machine learning models to select an appropriate activity question or activity question template. In this case, the machine learning models may be trained with activities extracted from a corpus of documents of communication sessions, workflows, and corresponding activity questions or activity question templates to learn appropriate activity questions to provide. Temporal activity serialization module 330 may employ various models to perform the learning (e.g., neural networks, mathematical/statistical models, classifiers, etc.). The machine learning models may receive information of the disconnected activities (e.g., activities and/or associated known information of the user interface) as input and be utilized to indicate an activity question or activity question template. The disconnected activities and/or known information of the user interface (e.g., aspects, workflows, rendering information, etc.) may be used as parameter values in the identified activity question template to generate the activity question.

The activity questions are presented to the user at operation 627. The activity questions may be presented on the interface used for the communication session, or another interface generated by video generation unit 116. A response from the user to the presented activity questions is received and parsed at operation 630 to identify information indicating an order for the disconnected activities. This may be accomplished by applying various natural language processing (NLP) techniques (e.g., entity detection, relationship detection, etc.). The order of the disconnected activities may be determined (e.g., via the sequence rules) based on the identified information and/or workflow, and a timestamp or other indicator specifying the order of the disconnected activities may be provided for each disconnected activity. The timestamp may also be determined from the document by applying natural language processing (NLP) techniques (e.g., entity detection, relationship detection, etc.).

When connected activities (e.g., no path or plural paths) are identified as determined at operations 615 and 620, one or more workflow questions or inquiries are generated at operation 635 to obtain supplemental information to determine a path corresponding to the activity set. For example, the question may be of the form "Do you remember whether you did X first or Y first?".

The workflow questions may be in the form of a workflow question template including content of the workflow question and corresponding parameters indicating the desired information to request. A set of workflow rules may be provided to identify the appropriate workflow question template for the retrieved activity set. Each workflow rule may provide criteria or conditions for employing a corresponding workflow question template based on the set of activities and/or identified paths. One or more workflow rules within the rule set may be identified based on the activities, workflow, and known information about the activities (e.g., names, locations, associated components of the user interface, etc.). The criteria or conditions of the identified workflow rules are applied to the information associated with the retrieved activity set to select the appropriate workflow question template. Once a workflow question template is selected, values for the parameters of the selected activity question template may be obtained from the activities and/or known information of the user interface (e.g., aspects, workflows, rendering information, etc.) to generate the question from the selected activity question template.

Alternatively, temporal activity serialization module 330 may employ one or more machine learning models to select an appropriate workflow question or workflow question template. In this case, the machine learning models may be trained with activities extracted from a corpus of documents of communication sessions, workflows, and corresponding workflow questions or workflow question templates to learn appropriate workflow questions to provide. Temporal activity serialization module 330 may employ various models to perform the learning (e.g., neural networks, mathematical/statistical models, classifiers, etc.). The machine learning models may receive information of the retrieved activity set (e.g., activities and/or associated known information of the user interface) as input and be utilized to indicate a workflow activity question or workflow question template. The activities of the retrieved activity set and/or known information of the user interface (e.g., aspects, workflows, rendering information, etc.) may be used as parameter values in the identified workflow question template to generate the workflow question.

The workflow questions are presented to the user at operation 637. The workflow questions may be presented on the interface used for the communication session, or another interface generated by video generation unit 116. A response from the user to the presented workflow questions is received and parsed at operation 640 to identify information indicating a path for the activity set. This may be accomplished by applying various natural language processing (NLP) techniques (e.g., entity detection, relationship detection, etc.). The path for the activity set is identified based on the identified information and/or workflow. For example, the path may be determined (e.g., via the sequence rules) based on the identified information and workflow when no path has previously been identified at operation 610. Alternatively, the path may be selected (e.g., via the sequence rules) from among plural paths based on the identified information when plural paths are identified at operation 610. A timestamp or other indicator specifying an order of the activities is provided for each activity of the activity set based on the identified path. The timestamp may also be determined from the document by applying natural language processing (NLP) techniques (e.g., entity detection, relationship detection, etc.) to the document.

The results of the above processing by time serialization module 330 (e.g., single path from operation 617, determined path from operation 630, or determined path from operation 640) resolve the activity ambiguities, and are provided to activity timeline creation module 340. The activity timeline creation module determines a timeline for the activities of the retrieved activity set at operation 645 based on the set of entries, workflow, and/or provided timestamps. The timeline may be of any desired format, and specifies times or order indications and corresponding activities.

Figure 7:
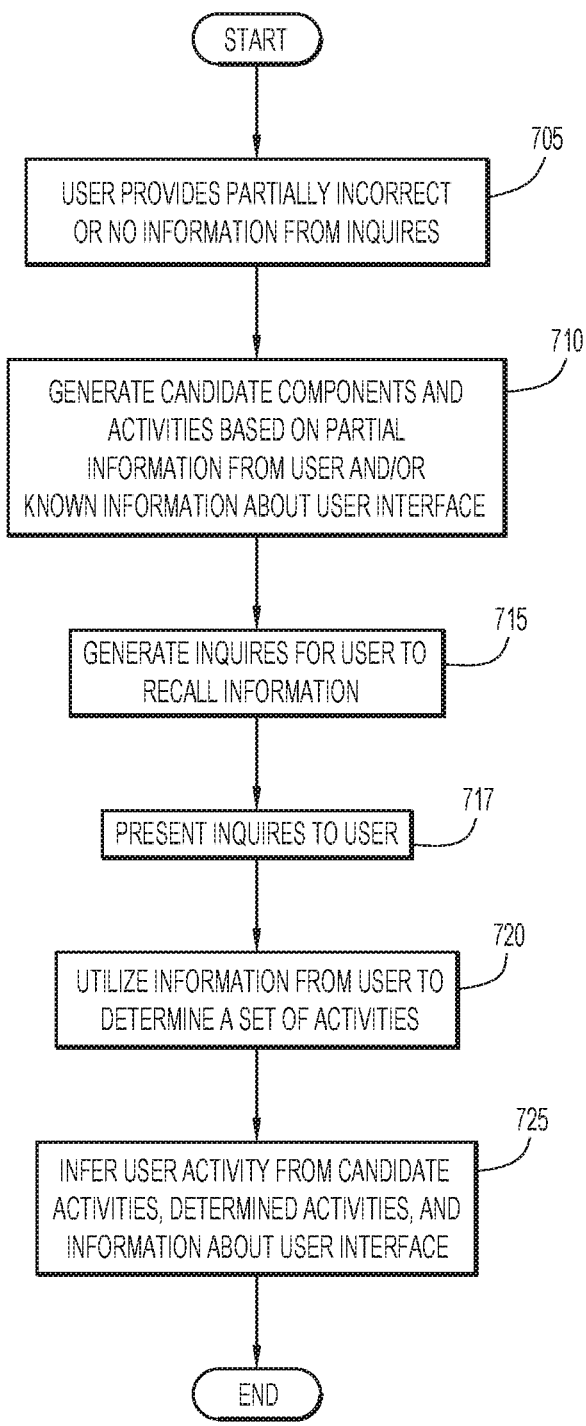
FIG. 7 is a procedural flowchart illustrating a manner of obtaining supplemental information from a user in order to determine an order of activities indicated by a user in a communication session according to an embodiment of the present invention.

There may be cases where the user is unable to respond to the activity and/or workflow questions, and/or may provide incorrect answers due to insufficient memory recall. Accordingly, the timeline produced by activity timeline creation module 340 may be incomplete. A manner of inferring activity information (e.g., via context-based activity inference module 350 and leading question generator 360, and server system 110 and/or client system 114) according to an embodiment of the present invention is illustrated in FIG. 7. Initially, a user may provide partially incorrect or no information from activity and/or workflow questions for a particular activity at operation 705. This may be reflected by missing activity information in at least one entry for extracted entities and activities, an incomplete activity timeline from activity timeline creation module 340, and/or based on verification of the responses against the workflow.

Context-based activity inference module 350 generates a set of candidate components and activities of the user interface at operation 710. The candidate activities are activities that may have been performed between states of the workflow associated with the particular activity. The set of candidate components and activities may be determined based on partial information from the user and/or known information of the user interface (e.g., aspects, workflows, rendering information, etc.). For example, the candidate components and activities may include activities that may have led the user from one state to another state within the workflow. By way of example, the user may have indicated that X and Z were performed, and the candidate activities may include Y since that was needed to travel from X to Z within the workflow. A set of candidate identification rules may be provided to identify the candidate components and activities from the known information of the user interface (e.g., aspects, workflows, rendering information, etc.). Each candidate identification rule may provide criteria or conditions for extracting activities and corresponding components from the known information of the user interface.

Leading question generator 360 may generate one or more leading questions at operation 715 to enable the user to recall their activities performed on the user interface. For example, a leading question may be of the form "Were you looking at the product specifications or customer reviews, when you clicked the button?".

The leading questions may be in the form of a leading question template including content of the question and corresponding parameters indicating the desired information to request. A set of recall rules may be provided to identify the appropriate leading question template for the particular activity. Each recall rule may provide criteria or conditions for employing a corresponding leading question template. One or more recall rules within the rule set may be identified based on the particular activity and known information about the candidate components and activities (e.g., names, locations, associated aspects of the user interface, etc.). The criteria or conditions of the identified recall rules are applied to the information associated with the particular activity to select the appropriate leading question template. Once a leading question template is selected, values for the parameters of the selected leading question template may be obtained from the particular activity and/or known information of the user interface (e.g., aspects, workflows, rendering information, etc.) to generate the question from the selected leading question template.

Alternatively, leading question generator 360 may employ one or more machine learning models to select an appropriate leading question or leading question template. In this case, the machine learning models may be trained with activities extracted from a corpus of documents of communication sessions, workflows, and corresponding leading questions or leading question templates to learn appropriate leading questions to provide. Leading question generator 360 may employ various models to perform the learning (e.g., neural networks, mathematical/statistical models, classifiers, etc.). The machine learning models may receive information of the particular activity (e.g., candidate components and activities and/or associated known information of the user interface) as input and be utilized to indicate a leading question or leading question template. The particular activity and/or known information of the user interface (e.g., aspects, workflows, rendering information, etc.) may be used as parameter values in the identified leading question template to generate the leading question.

The leading questions are presented to the user at operation 717. The leading questions may be presented on the interface used for the communication session, or another interface generated by video generation unit 116. A response from the user to the presented leading questions is received and parsed at operation 720 to identify information associated with the particular activity. This may be accomplished by applying various natural language processing (NLP) techniques (e.g., entity detection, etc.). The information may be used to identify a set of non-core or secondary activities performed by the user on the user interface (e.g., reviewing a product, etc.).

The information from the user response to the leading questions is utilized in combination with the set of candidate activities and known information of the user interface (e.g., aspects, workflows, rendering information, etc.) to infer the particular activity at operation 725. The entry corresponding to the particular activity may be updated with the inferred activity. For example, the user may have indicated for the particular activity that a product specification was being reviewed. Thus, there is a likelihood that the particular activity may be actuating a button situated near the product description section. A set of inference rules may be provided to identify the particular activity based on the response information, set of candidate components and activities, and/or known information of the user interface (e.g., aspects, workflows, rendering information, etc.). Each inference rule may provide criteria or conditions for identifying a corresponding activity as the inferred activity.

Alternatively, context-based activity inference module 350 may employ one or more machine learning models to infer the particular activity. In this case, the machine learning models may be trained with activities extracted from a corpus of documents of communication sessions, workflows, and corresponding responses to leading questions to learn the activity. Context-based activity inference module 350 may employ various models to perform the learning (e.g., neural networks, mathematical/statistical models, classifiers, etc.). The machine learning models may receive information of the particular activity (e.g., candidate components and activities and/or associated known information of the user interface) as input and be utilized to indicate an inferred activity for the particular activity.

Figure 8:
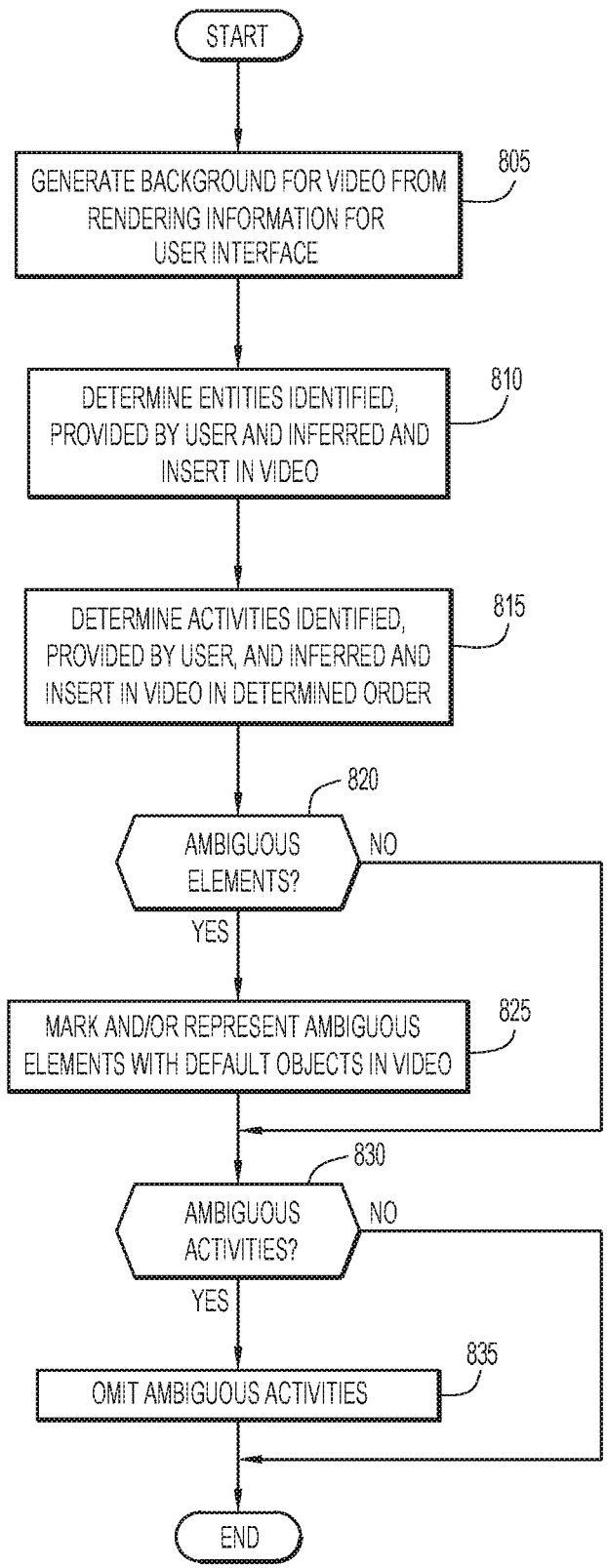
FIG. 8 is a procedural flowchart illustrating a manner of generating a video of activities performed by a user on a user interface according to an embodiment of the present invention.

Based on the above processing, the elements and activities for the contexts of the user interface in the interactive session are identified, and video 380 (FIG. 3) may be generated in a post-facto manner based upon information obtained from the communication session. A manner of generating the video (e.g., via video generation module 370, and server system 110 and/or client system 114) according to an embodiment of the present invention is illustrated in FIG. 8. The video generation module generates a video of the interactive session comprising a video clip for each corresponding activity and entity extracted from the document. The video clips may be generated from pre-formed video snippets stored in database 118 that serve as a video clip template and illustrate a corresponding particular activity on the user interface. The video may include any quantity of video clips (or activities and entities) for the interactive session.

In particular, a set of entries is received with each entry specifying a mapped element, activity, and context for a corresponding extracted entity or activity as described above. A background is generated for video clips of the video associated with the entities and activities in the received set of entries at operation 805. The background is generated using rendering information of the user interface (e.g., background images, layout, rendering dimensions, user mouse movements, etc.). The elements mapped to the user interface and associated with entities of the received set of entries are retrieved from the received set of entries, and inserted within the foreground of corresponding video clips at operation 810. The mapped elements within the received set of entries may be determined based on entities and/or activities extracted from the document, obtained from the questions, and/or inferred as described above.

The activities mapped to the user interface and associated with activities of the received set of entries are retrieved from the received set of entries, and inserted within the foreground of corresponding video clips in the determined order at operation 815. The activities within the received set of entries may be determined based on the entities and/or activities extracted from the document, obtained from the activity and leading questions, and/or inferred as described above. The determined order (or temporal serialization) of the activities and the responses to the activity, leading, and other questions ensure that missing/inferred elements and activities are appropriately inserted within the video between the elements and activities directly mapped to the user interface from entities and activities extracted from the document containing content of the communication session.

When one or more ambiguous (or unidentified) elements are present within the received set of entries for at least one entity or activity as determined at operation 820, the ambiguous elements are indicated by marking (e.g., highlighting, etc.) the ambiguous elements and/or representing (or replacing) the ambiguous elements with default (sentinel) objects within corresponding video clips at operation 825.

When one or more ambiguous (or unrecognized) activities are present within the received set of entries for at least one entity or activity as determined at operation 830, the ambiguous activities are omitted from the video at operation 835.

The video may be generated using any conventional or other video creation applications, where the play rate may be any reasonable rate suitable for human comprehension or consumption.

Present invention embodiments may generate a video during the communication session between the user and support provider as information is being exchanged (e.g., questions and responses, messages, etc.). The content of the communication session may be monitored to generate video clips for each activity encountered in substantially the same manner described above. Any quantity of the video clips may be combined or appended to form the video. Alternatively, the video may be generated at the completion of the communication session based on a log or other recording of content of the communication session. The document may store any portion of content of the communication session in any suitable format (e.g., text, codes indicating alphanumeric characters, any other format from which text or alphanumeric characters may be derived, etc.). Further, present invention embodiments may be applied to communication sessions in any desired spoken language.

It will be appreciated that the embodiments described above and illustrated in the drawings represent only a few of the many ways of implementing embodiments for generating a video of an interactive session on a user interface.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, video generation unit, network application, client application, etc.). These systems may include any types of monitors and input devices (e.g., keyboard, mouse, voice recognition, etc.) to enter and/or view information.

It is to be understood that the software (e.g., video generation unit, network application, local client application, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., video generation unit, network application, client application, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store any desired information (e.g., video information, interface information, interface workflows, questions, rules for presenting questions, rules of inference, rendering information, communication session documents, entries for extracted items, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report of analysis results for video generation (e.g., analysis of the document, etc.) may include any information arranged in any fashion, and may be configurable based on rules or other criteria to provide desired information to a user.

The present invention embodiments are not limited to the specific tasks or algorithms described above, but may be utilized for generating a video of any type of user interface from any communication session or document containing information pertaining to the user interface. The document may store information pertaining to the user interface in any suitable format (e.g., text, codes indicating alphanumeric characters, any other format from which text or alphanumeric characters may be derived, etc.). A policy to identify sessions or scenarios for which a video is to be generated may be expressed via any desired criteria (e.g., keywords, concepts, rules, etc.). The filtering concepts may be compared to the document using any suitable matching or comparisons (e.g., semantic matching, keyword match volume and count, word similarity, edit distance, etc.). The threshold may set to any desired values to attain a desired sensitivity/granularity for generating videos (e.g., a higher threshold may produce fewer videos, etc.).

The items may be extracted from the document via any suitable natural language or other techniques (e.g., word lists, entity detection, etc.). The items may include any desired objects (e.g., attributes, properties, elements, screens, activities, etc.) associated with the user interface. The mapping of the extracted items may be performed based on various comparison or matching operations (e.g., cosine similarity, word embedding, natural language processing (NLP) techniques (e.g., surrounding words, neighboring words, entity detection, relationship detection, etc.), etc.) applied to any desired attributes (e.g., name, properties, etc.) of the entities and activities being compared.

The questions generated by present invention embodiments (e.g., activity, workflow, leading, etc.) may be of any quantity and form, and may request any suitable information. The question templates of present invention embodiments (e.g., activity, workflow, leading, etc.) may be of any quantity or format, and may generate questions requesting any desired information. The templates may include any quantity of any types of parameters to generate a question. The questions and templates may be selected in any fashion (e.g., machine learning, rules, criteria, etc.). The responses may be parsed in any manner to identify information relevant to missing/incomplete information (e.g., NLP, word search/comparison, etc.).

The user interface may be associated with any quantity of workflows indicating sequences of activities and corresponding information for the user interface. The activities of the interactive session may include any types of activities enabled by a user or other type of interface (e.g., actuation of actuators, scrolling, selection, navigation, field entry, etc.). The timestamp may be any suitable indicator providing an order for the activities (e.g., indication of time, position within a sequence, etc.). The order of activities may be based on the workflow, paths, document, and/or timestamps.

The various rules of present invention embodiments (e.g., activity, workflow, inference, recall, etc.) may be of any quantity or format, and may include any quantity of any desired criteria or conditions. The video may comprise any quantity of video clips, each associated with any quantity of activities and user interface components. The video clips may include any quantity of images or frames, and be associated with any quantity of any types of activities. The video may be produced in any desired format, and may be played at any desired rate (e.g., any quantity of frames per second, etc.). For example, the display rate may be in a range between 20 and 70 frames per second, such as play rates of 24, 30 or 60 frames per second. The unmapped elements may be marked or indicated within the video in any desired fashion (e.g., highlighted, different color, effect (e.g., flashing, bright, etc.), tag or label, etc.). The unmapped elements may be represented and/or replaced by any desired objects, where the objects may be marked (e.g., highlighted, different color, effect (e.g., flashing, bright, etc.), tag or label, etc.) or unmarked.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating a video comprising:
   identifying, via at least one processor, a scenario within a document including content of a communication session, wherein the communication session pertains to support for use of a user interface;
   extracting from the document, via the at least one processor, one or more items corresponding to the identified scenario and associated with the user interface;
   mapping, via the at least one processor, the extracted items to corresponding aspects of the user interface, wherein at least one of the extracted items remains unmapped to the user interface;
   determining, via the at least one processor, at least one question for a user to receive information to map an unmapped item to a corresponding aspect of the user interface; and
   generating, via the at least one processor, a video based on the mapped aspects of the user interface to reproduce one or more activities performed during the use of the user interface.

2. The method of claim 1, wherein identifying a scenario comprises:
   determining a similarity score based on a comparison of a group of keywords from the document to a set of filtering concepts indicating criteria for the scenario; and
   identifying the scenario based on the similarity score satisfying a threshold.

3. The method of claim 1, wherein the corresponding aspects of the user interface include a plurality of activities for the user interface, and the method further comprises:

determining an order of performance of the plurality of activities of the corresponding aspects based on a workflow of the user interface.

4. The method of claim 3, wherein the plurality of activities of the corresponding aspects are disconnected, and determining an order of performance comprises:
generating one or more activity questions for the user to receive information pertaining to the order of performance of the plurality of disconnected activities; and
determining the order of performance of the plurality of disconnected activities based on the information received in response to the one or more activity questions.

5. The method of claim 3, wherein the plurality of activities of the corresponding aspects are associated with plural paths each specifying an order for the plurality of activities, and determining an order of performance comprises:
generating one or more activity questions for the user to receive information pertaining to the order of performance of the plurality of activities; and
identifying a particular path corresponding to the plurality of activities from among the plural paths based on the information received in response to the one or more activity questions.

6. The method of claim 1, wherein the information from the at least one question is insufficient to map an unmapped item to the user interface, and the method further comprises:
generating one or more leading questions for the user to recall information pertaining to the unmapped item; and
inferring a mapping to the user interface for the unmapped item based on the recalled information received in response to the one or more leading questions.

7. The method of claim 1, wherein the mapped aspects include one or more elements and corresponding activities of the user interface, and generating the video further comprises:
generating a background for the video from rendering information of the user interface;
inserting the mapped aspects in a foreground of the video, wherein the corresponding activities of the mapped aspects are inserted in the video in order of performance; and
indicating each unmapped item in the video.

8. A system for generating a video comprising:
at least one processor configured to:
identify a scenario within a document including content of a communication session, wherein the communication session pertains to support for use of a user interface;
extract from the document one or more items corresponding to the identified scenario and associated with the user interface;
map the extracted items to corresponding aspects of the user interface, wherein at least one of the extracted items remains unmapped to the user interface;
determine at least one question for a user to receive information to map an unmapped item to a corresponding aspect of the user interface; and
generate a video based on the mapped aspects of the user interface to reproduce one or more activities performed during the use of the user interface.

9. The system of claim 8, wherein identifying a scenario comprises:

determining a similarity score based on a comparison of a group of keywords from the document to a set of filtering concepts indicating criteria for the scenario; and
identifying the scenario based on the similarity score satisfying a threshold.

10. The system of claim 8, wherein the corresponding aspects of the user interface include a plurality of activities for the user interface, and the at least one processor is further configured to:
determine an order of performance of the plurality of activities of the corresponding aspects based on a workflow of the user interface.

11. The system of claim 10, wherein the plurality of activities of the corresponding aspects are associated with plural paths each specifying an order for the plurality of activities, and determining an order of performance comprises:
generating one or more activity questions for the user to receive information pertaining to the order of performance of the plurality of activities; and
identifying a particular path corresponding to the plurality of activities from among the plural paths based on the information received in response to the one or more activity questions.

12. The system of claim 8, wherein the information from the at least one question is insufficient to map an unmapped item to the user interface, and the at least one processor is further configured to:
generate one or more leading questions for the user to recall information pertaining to the unmapped item; and
infer a mapping to the user interface for the unmapped item based on the recalled information received in response to the one or more leading questions.

13. The system of claim 8, wherein the mapped aspects include one or more elements and corresponding activities of the user interface, and generating the video further comprises:
generating a background for the video from rendering information of the user interface;
inserting the mapped aspects in a foreground of the video, wherein the corresponding activities of the mapped aspects are inserted in the video in order of performance; and
indicating each unmapped item in the video.

14. A computer program product for generating a video, the computer program product comprising one or more non-transitory computer readable storage media collectively having program instructions embodied therewith, the program instructions executable by at least one processor to cause the at least one processor to:
identify a scenario within a document including content of a communication session, wherein the communication session pertains to support for use of a user interface;
extract from the document one or more items corresponding to the identified scenario and associated with the user interface;
map the extracted items to corresponding aspects of the user interface, wherein at least one of the extracted items remains unmapped to the user interface;
determine at least one question for a user to receive information to map an unmapped item to a corresponding aspect of the user interface; and
generate a video based on the mapped aspects of the user interface to reproduce one or more activities performed during the use of the user interface.

15. The computer program product of claim 14, wherein identifying a scenario comprises:
- determining a similarity score based on a comparison of a group of keywords from the document to a set of filtering concepts indicating criteria for the scenario; and
- identifying the scenario based on the similarity score satisfying a threshold.

16. The computer program product of claim 14, wherein the corresponding aspects of the user interface include a plurality of activities for the user interface, and the program instructions further cause the at least one processor to:
- determine an order of performance of the plurality of activities of the corresponding aspects based on a workflow of the user interface.

17. The computer program product of claim 16, wherein the plurality of activities of the corresponding aspects are disconnected, and determining an order of performance comprises:
- generating one or more activity questions for the user to receive information pertaining to the order of performance of the plurality of disconnected activities; and
- determining the order of performance of the plurality of disconnected activities based on the information received in response to the one or more activity questions.

18. The computer program product of claim 16, wherein the plurality of activities of the corresponding aspects are associated with plural paths each specifying an order for the plurality of activities, and determining an order of performance comprises:
- generating one or more activity questions for the user to receive information pertaining to the order of performance of the plurality of activities; and
- identifying a particular path corresponding to the plurality of activities from among the plural paths based on the information received in response to the one or more activity questions.

19. The computer program product of claim 14, wherein the information from the at least one question is insufficient to map an unmapped item to the user interface, and the program instructions further cause the at least one processor to:
- generate one or more leading questions for the user to recall information pertaining to the unmapped item; and
- infer a mapping to the user interface for the unmapped item based on the recalled information received in response to the one or more leading questions.

20. The computer program product of claim 14, wherein the mapped aspects include one or more elements and corresponding activities of the user interface, and generating the video further comprises:
- generating a background for the video from rendering information of the user interface;
- inserting the mapped aspects in a foreground of the video, wherein the corresponding activities of the mapped aspects are inserted in the video in order of performance; and
- indicating each unmapped item in the video.

* * * * *